United States Patent [19]

Orii

[11] Patent Number: 4,934,844
[45] Date of Patent: Jun. 19, 1990

[54] REMOTE-CONTROL SYSTEM FOR SEWING MACHINE

[75] Inventor: Akira Orii, Hachioji, Japan

[73] Assignee: Janome Sewing Machine Industry Co., Inc., Tokyo, Japan

[21] Appl. No.: 283,338

[22] Filed: Dec. 12, 1988

[30] Foreign Application Priority Data

Dec. 10, 1987 [JP] Japan .................. 62-311017

[51] Int. Cl.⁵ .............................................. H02P 5/16
[52] U.S. Cl. .................................... 388/840; 388/828
[58] Field of Search ............... 318/301, 305, 306–311, 318/345; 388/825–827, 828–829, 830–833, 837–840, 927

[56] References Cited

U.S. PATENT DOCUMENTS

| | | | |
|---|---|---|---|
| 4,139,808 | 2/1979 | Matsumura | 318/245 G |
| 4,168,455 | 9/1979 | Soeda et al. | 318/345 D |
| 4,181,876 | 1/1980 | Kato et al. | 318/345 H |
| 4,232,258 | 11/1980 | Matsumura | 318/345 H |
| 4,246,521 | 1/1981 | Soeda et al. | 318/345 CA |
| 4,274,037 | 6/1981 | Soeda | 318/345 CA |

Primary Examiner—William M. Shoop, Jr.
Assistant Examiner—David S. Martin
Attorney, Agent, or Firm—Klein & Vibber

[57] ABSTRACT

A remote-control system is used in combination with a sewing machine for controlling revolution of a sewing machine motor. A remote-controller is connected to a main body of the sewing machine and operated by the sewing machine operator to change a resistance value of a variable resistor contained therein so that the sewing machine motor is driven under control in response to an output volume from the variable resistor. A condensor is connected to said variable resistor and chargeable by a power supply source mounted in the sewing machine main body. The output voltage is converted into a corresponding digital value at each timing when the condensor is saturated with electricity in response to a clock pulse signal at a predetermined interval. The output voltage at such timing will be in proportion to the resistance value of the variable resistor which is, in turn, in porportion to the amount of operation of the remote-controller.

5 Claims, 4 Drawing Sheets

MAIN BODY OF SEWING MACHINE

REMOTE-CONTROL SYSTEM FOR SEWING MACHINE

BACKGROUND OF THE INVENTION

This invention relates to a remote-control system for controlling revolution of a motor provided for a sewing machine.

As having been well known in the art, a remote-controller is detachably connected to an electronic sewing machine and step-operated by the sewing machine operator to control revolution of a motor and therefore to control an operating speed of the sewing machine.

The prior art remote-control system can be classified into two types. One is of a two-wire system in which a variable resistor [VR] in a remote-controller is connected by a couple of wires to the sewing machine, as shown in FIG. 1 (b). An output voltage [Vout] from the variable resistor [VR] is determined by the following equation (1):

$$V\text{out} = V cc \times \frac{r1}{r1 + R1} \quad (1)$$

The r1=0 when no step-operation is applied to the remote-controller and is varied in proportion to a stepping amount of the remote-controller. Accordingly, the output voltage [Vout] will draw a quadratic curve as shown in FIG. 1(a). This means that the output voltage [Vout] will not increase in proportion to the stepping amount of the remote-controller, resulting in less controllability.

Due to errors in resistance values of the resistors VR and R1, the output voltage [Vout] would be varied within a certain range. More particularly, in FIG. 1(a), a curve referred to by [VRmin] shows the output voltage [Vout] when the actual resistance values of the resistors VR and R1 provide the minimum VR to R1 ratio, whereas another curve [VR max] traces a value of the output voltage [Vout] in the case of the maximum VR to R1 ratio. A reference value [Vtyp] of the output voltage [Vout] exists in the middle of [VRmax] and [VRmin].

Now, provided that the remote-controller is made operative or turned on when the operator steps the same to the extent that 12.5% of the output volume [Vout] is obtained. Such starting point of the remote-controller will be determined in dependence upon the output volume [Vout] but may actually be varied in a wide range from [ONmin] to [ONmax]. The operator could not exactly know when the sewing machine actually starts to operate while stepping the remote-controller by degree.

The operation of the prior art remote-controller of two-wire system has been uncontrollable as above described and therefore not put into practice, while having in turn an advantage that the sewing machine can be operated with safety. If one of the wires connected to the variable resistor VR should be broken down, Vout becomes zero resulting in an emergency stop of the sewing machine.

Another prior art remote-controller is of three-wire system as shown in FIG. 2(a) and (b). With this improved remote-controller, the output volume [Vout] is obtained in accordance with the following equation (2):

$$V\text{out} = V cc \times \frac{r2}{R1 + VR} \quad (2)$$

where $R1 << VR$

As the resistance r2 increases from zero in proportion with the stepping amount of the controller, the output volume [Vout] increases on the straight from zero as apparently shown in the above equation (2) and also in FIG. 2(b). Thus, the controller of this type has improved controllability. FIG. 2(b) also shows that the controller is turned on in response to a substantially constant stepping amount, which is effected at 12.5% of the output volume [Vout] in the example shown, even when the resistors VR and R1 have incorrect resistance values.

According to this prior art controller having improved controllability and responsibility, however, when one (terminal No. 3, for example) of the wires connected thereto is broken down, Vout will rapidly increase to an extremely high level just the same as Vcc so that the sewing machine will be rotated at a tremendous speed. It has therefore been required to provide means for detecting disconnection of the wires, as a safety device. A single cord containing three wires would be of relatively a large diameter, which could not easily be reeled in.

SUMMARY OF THE INVENTION

It is therefore an object of this invention to provide a novel remote-control system for remote-controlling operation of an electronic sewing machine, capable of eliminating defects and disadvantages encountered in the prior art systems.

The principal object of this invention is to provide a remote-control system for a sewing machine which is of a two-wire system and yet has improved controllability and responsibility equivalent to the three-wire system.

According to an aspect of this invention there is provided a remote-control system used in combination with a sewing machine for controlling revolution of a sewing machine motor, comprising a remote-controller operated by the sewing machine operator to change a resistance value of a variable resistor contained therein, the variable resistor being connected to a first power supply mounted in a main body of the sewing machine so that the sewing machine motor is driven under control in response to an output volume from the variable resistor. A secondary voltage supply source is connected to said variable resistor in said remote-controller and chargeable by said first power source in said main body of the sewing machine. The output voltage is processed in response to a clock pulse signal at a predetermined interval.

Further objects and advantages of this invention can be fully understood from the following detailed description when read in conjunction with the accompanying drawings in which:

FIG. 1(a) and FIG. 1(b) show characteristics and circuits of the prior art remote-control system;

FIG. 2(a) and FIG. 2(b) show characteristics and circuits of the prior art system of a type different from that shown in FIG. 1(a) and FIG. 1(b);

DESCRIPTION OF A PREFERRED EMBODIMENT

Figure 1A:
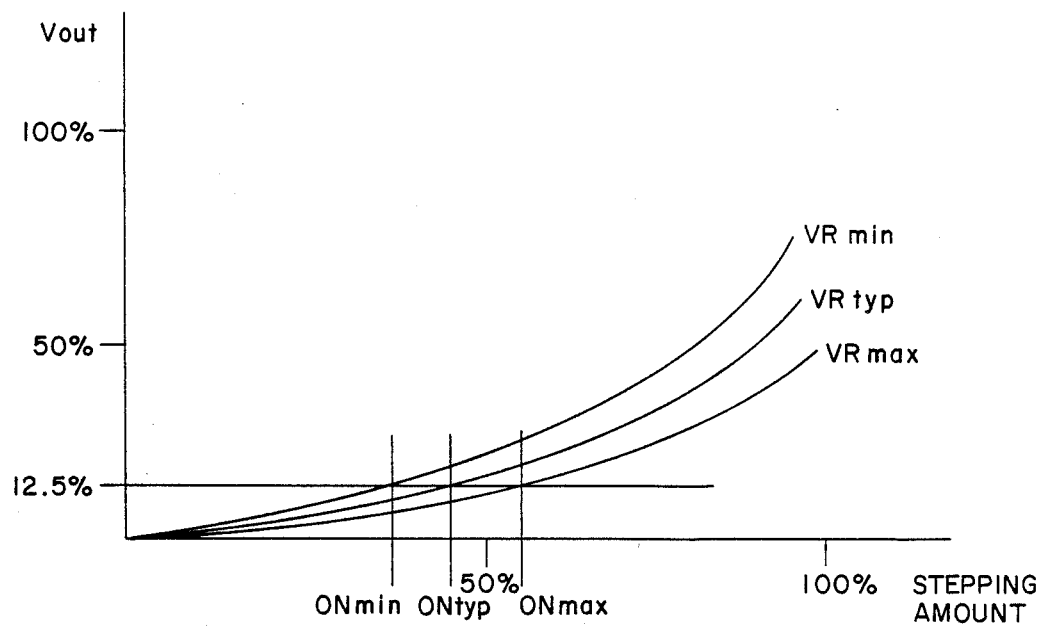
Figure 1B:
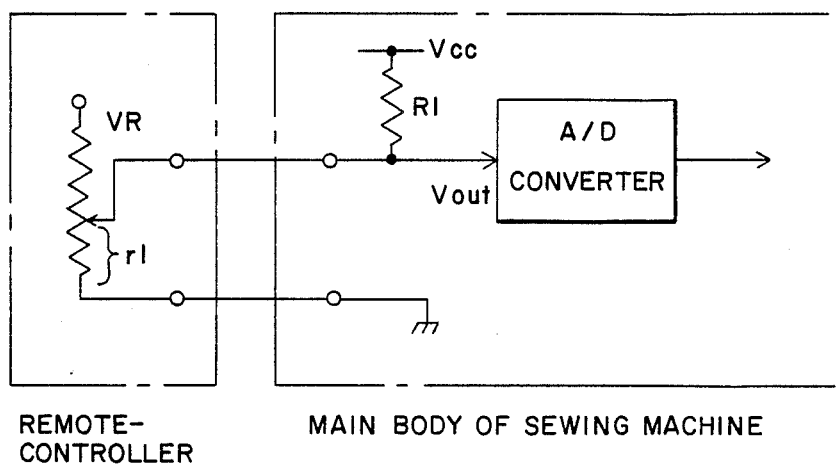
Figure 2A:
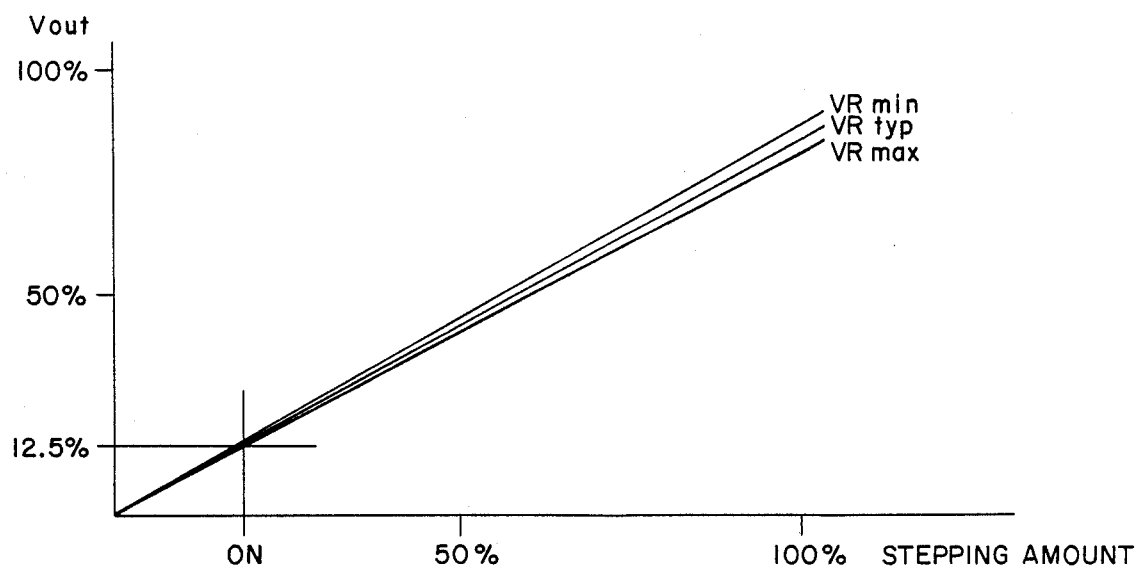
Figure 2B:
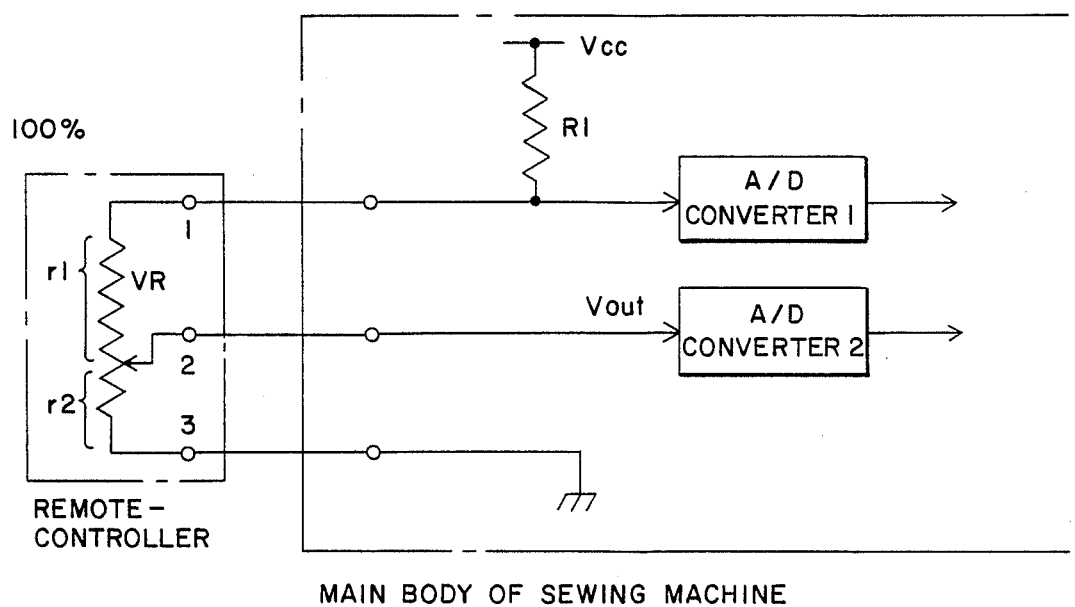
Figure 3A:
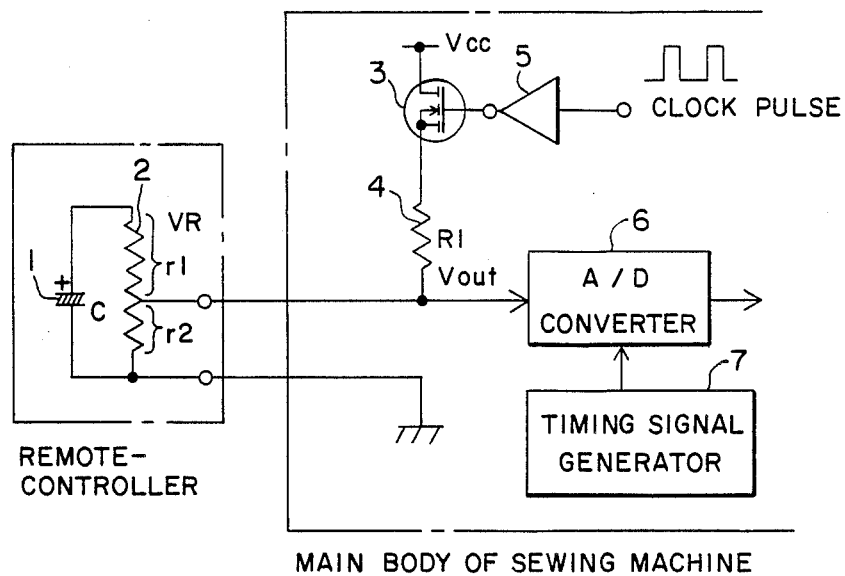
FIG. 3(a) shows circuits of a remote-control system embodying the invention.

In FIG. 3(a), a remote-control system according to this invention comprises a remote-controller connectable to an electronic sewing machine. In the remote-controller, a secondary voltage supply source or condensor 1 is mounted and connected in parallel to a variable resistance [VR] 2.

In the sewing machine, a MOS (Metal Oxide Semiconductor) type FET (Field Effect Transistor) 3 is operated in response to a clock pulse signal sent through a gate 5 to supply power from a primary power supply Vcc to the condensor 1 in the remote-controller. The current supplied to the condensor 1 is controlled by a resistor [R1] 4 having a resistance value considerably smaller than that of the variable resistor [VR]2. The voltage [Vout] output from the variable resistor [VR] 2 is converted into a digital signal by an analog/digital converter 6 which is operated responsive to a timing signal supplied from a signal generator 7 at a descending timing of the clock pulse signal.

Figure 3B:
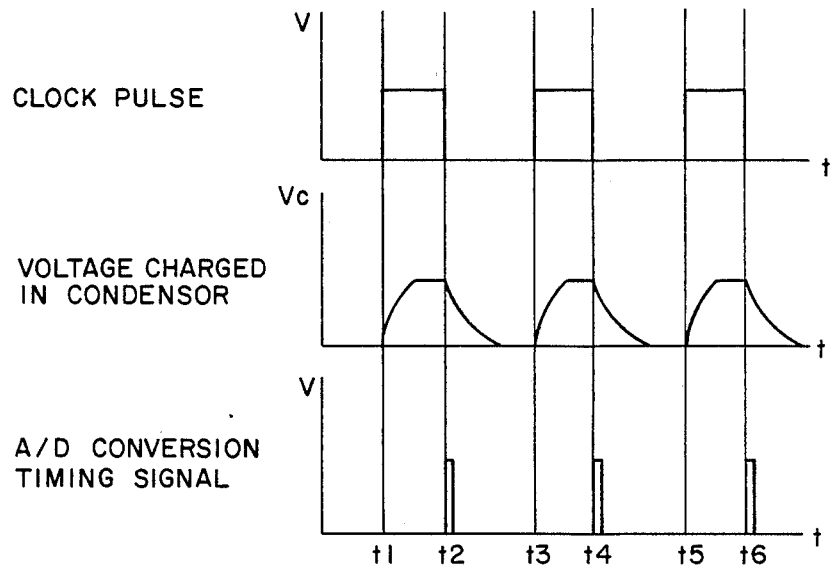
FIG. 3(b) is a timing chart showing the operation of the system shown in FIG. 3(a)

In the system having the above arrangement, FET 3 starts to charge the condensor 1 with electrocity as from a time t1, as shown in FIG. 3(b). The charged voltage [Vc] of the condensor 1 is determined by the following equation (3):

$$Vc = Vcc \times \frac{r2}{R1 + r2} (1 - e^{-k}) \quad (3)$$

$$\text{where } k = \frac{(R1 + r2) t}{(R1 \cdot r1 + r1 \cdot r2 + R1 \cdot r2) \times C}$$

and C represents capacity of the concensor.

Supposed that R1=0 in the equation (3) for convenience's sake, the following equation (4) can be obtained:

$$Vc = Vcc (1 - e^{-m}) \quad (4)$$

$$\text{where } m = \frac{t}{r1 \cdot C}$$

In this equation (4) t=0 at t1. At a time approximate to t2, as t will have a value considerably larger than R1·C, the following equation could nealy be obtained:
Vc=Vcc
FET 3 is turned off at t2.

The output volume [Vout] at a time t≧t2 is represented by:

$$V\text{out} = \frac{Vc \cdot r2}{VR} e^{-n} \quad (6)$$

$$\text{where } n = \frac{t}{C \cdot VR}$$

In this equation t sharts from t2 so that the output volume [Vout] at t2 is represented by:

$$V\text{out} = \frac{Vc \cdot r2}{VR} \quad (7)$$

By repeating such operation as shown in FIG. 3(b), the output voltage [Vout] can be obtained at t2, t4, t6, . . . which is just proportional to the stepping amount of the controller as well represented by the equation (7). The output voltage [Vout] is converted into a corresponding digital value by the A/D converter 6 responsive to the timing signal each generated at t2, t4, t6, . . .

Figure 3C:
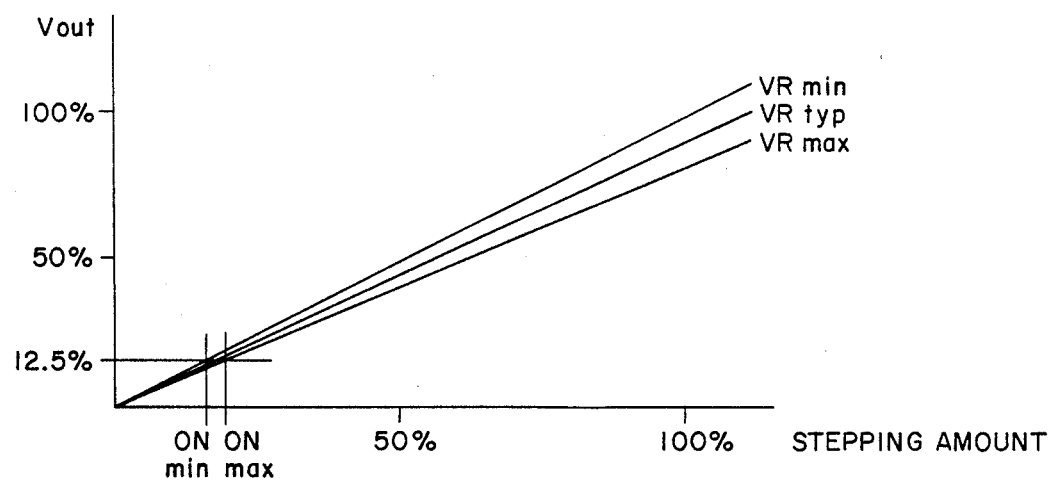
FIG. 3(c) is a graph showing relation between the output voltage and the stepping amount of the controller employed in the system shown in FIG. 3(a).

FIG. 3(c) shows relation between the output volume [Vout] obtained at t2, t4, t6, . . . and the stepping amount. As shown, the stepping amount required to make the sewing machine operative, which is established when 12.5% of the output volume [Vout] is obtained in the embodiment shown, will be substantially standstill and not varied regardless of the resistance VR to R1 ratios being varied.

In this embodiment, if one of the wires connected between the sewing machine and the remote-controller, the output voltage [Vout] becomes zero to stop the sewing machine operation, in the like manner as in the prior art two-wire system.

Although the invention has been described in conjunction with a specific embodiment thereof, it is to be understood that many variations and modifications may be made without departing from spirit and scope of the invention as defined in the appended claims. For example, the output voltage [Vout] may be of a maximum value when no operation is applied to the remote-controller and decreased in proportion as the stepping amount of the remote-controller increases.

What is claimed is:

1. In a remote control system used in combination with a sewing machine for controlling revolution of a sewing machine motor, comprising a remote-controller operated by the sewing machine operator to change a resistance value of a variable resistor contained therein, the variable resistor being connected to a first power supply mounted in a main body of the sewing machine so that the sewing machine motor is driven under control in response to an output volume from the variable resistor, the improvement comprising a secondary voltage supply source connected to said variable resistor in said remote-controller and chargeable by said first power source in said main body of the sewing machine, and clock pulse generating means mounted in said main body of the sewing machine for sampling the output voltage from said variable resistor at a predetermined interval.

2. The system according to claim 1 wherein said clock pulse generating means includes a transistor for supplying a power from said first power source to said secondary voltage supply source to thereby charge said secondary voltage supply source with electricity.

3. The system according to claim 2 wherein said clock pulse generating means samples the output volume from said variable resistor each time when said secondary voltage supply source is fully charged and saturated with electricity by said first power source.

4. The system according to claim 3 wherein the output volume sampled by said clock pulse generating means is converted into a corresponding digital value.

5. The system according to claim 1 wherein said secondary voltage supply source comprises a condensor.

* * * * *

UNITED STATES PATENT AND TRADEMARK OFFICE
CERTIFICATE OF CORRECTION

PATENT NO. : 4,934,844
DATED : June 19, 1990
INVENTOR(S) : Akira ORII

It is certified that error appears in the above-identified patent and that said Letters Patent is hereby corrected as shown below:

Cover page, item [73], lines 1-2, delete "Janome Sewing Machine Industry Co., Inc." and substitute therefor --Janome Sewing Machine Industry Co., Ltd.--

Signed and Sealed this

Twentieth Day of August, 1991

Attest:

HARRY F. MANBECK, JR.

Attesting Officer     Commissioner of Patents and Trademarks